Dec. 29, 1936. J. EGGERT ET AL 2,066,102
REPRODUCTION OF PHOTOGRAPHIC SOUND RECORDS
Filed June 13, 1935
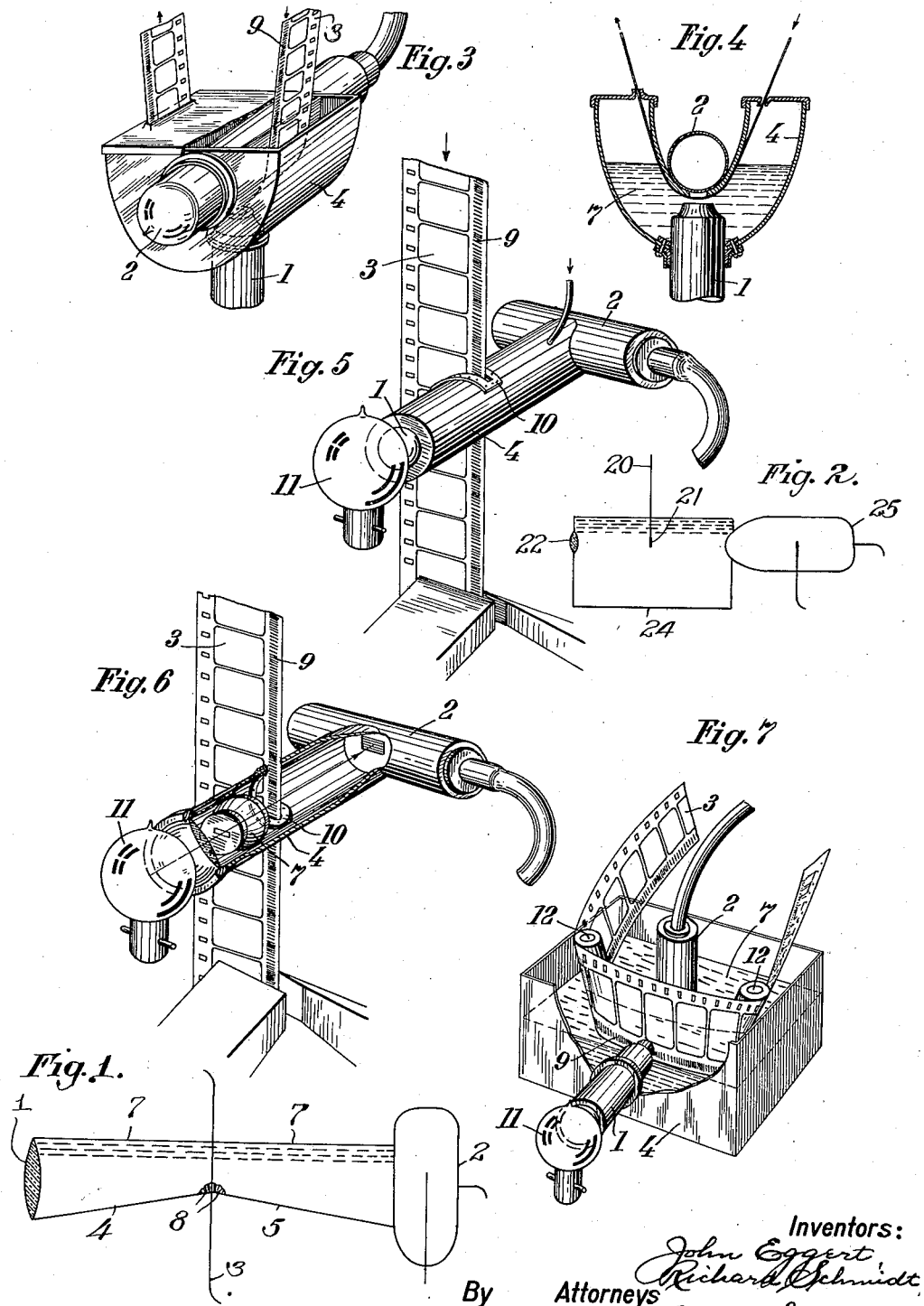
Inventors:
John Eggert,
Richard Schmidt,
By Attorneys
Potter, Pierce & Scheffler.

Patented Dec. 29, 1936

2,066,102

UNITED STATES PATENT OFFICE 2,066,102

REPRODUCTION OF PHOTOGRAPHIC SOUND RECORDS

John Eggert, Leipzig - Gohlis, and Richard Schmidt, Dessau, Germany, assignors to I. G. Farbenindustrie Aktiengesellschaft, Frankfort-on-the-Main, Germany Application June 13, 1935, Serial No. 26,490
In Germany June 22, 1934

5 Claims. (Cl. 179—100.3)

Our present invention relates to the reproduction of photographic sound records.

One of its objects is an arrangement for an improved reproduction of a sound record by scanning it with a beam of light. Another object is an arrangement for the reproduction of a sound record by scanning it with a beam of light whereby the ground noise is materially reduced. Further objects will be seen from the detailed specification following hereafter. Reference is made to the accompanying drawing in which Fig. 1 shows diagrammatically an arrangement according to this invention, Fig. 2 shows diagrammatically a modified arrangement according to this invention, Fig. 3 shows a conventional view container of a further modification of an arrangement according to this invention part of the lid being broken away.

Fig. 4 shows a section of Fig. 3 on the line 4—4,

Fig. 5 shows a conventional view of the arrangement diagrammatically shown in Fig. 2, Fig. 6 shows the arrangement illustrated in Fig. 5, but part of the container through which the film travels being broken away, and Fig. 7 shows another modification of an arrangement according to this invention.

The essence of this invention is an arrangement for the reproduction of sound records by scanning the record with a beam of light in which the beam of light which scans the sound track emerges from the optical system and passes through the layer containing the sound record or is reflected by the support to a photo-cell along a track comprised completely in a liquid, the refractive index of which is as far as possible equal to that of the support if the beam of light passes through a transparent support or equal to the refractive index of the material of the layer containing the sound track if the beam of light is refracted by the support. The sound records which enter into consideration are particularly the sound records produced by photographic sound recording, but also the sound records which are first recorded mechanically and then by suitable operations converted into sound records which for reproduction are scanned with a beam of light falling on a photo-cell. The support for the sound track may be a transparent film or plate, such as a film of a cellulose derivative or cellulose hydrate, or a glass plate, or it may be made of a reflecting material, for instance, metal or paper.

It is known practice to moisten a sound film during the reproduction with a liquid having the refractive index of the film material for the purpose of diminishing the ground noise. In this case the scanning beam, after leaving the optical system, first passes through the air, then through the layer of liquid, then through the film and in certain cases a second layer of liquid, whereupon, after passing through a further layer of air, it enters the photo-cell.

The air boundary surface of the film carrying the sound record is the cause of considerable loss of light which must be compensated by enlarging the luminous slot. The present invention avoids the air layers in the path of the scanning beam. The optical system for producing the beam is arranged in the manner of an immersion lens system such as is known in connection with microscope optical systems. The air space between the side of the support which does not carry the sound record layer and the photo-cell is also eliminated. On leaving the optical system the beam enters a liquid the refraction index of which is as far as possible equal to that of the layer containing the sound record; a suitable liquid for this purpose is carbon tetrachloride. Then the beam travels through the sound record layer, where it is modulated in accordance with the opacity, and then again through the liquid to the photo-cell. The term "photo-cell" includes any device capable of converting the light into electrical energy.

In the accompanying drawing, Figs. 1 and 2 illustrate two examples of the arrangement.

In Fig. 1, 1 is the front lens of the optical system, between which and the film 3 carrying the sound record layer extends container 4 in form of a tube or a channel 4 containing a suitable liquid 7, for example carbon tetrachloride. A similar channel 5 is placed between the film 3 and the photo-cell 2. Between the channels 4 and 5 and the film 3 there is a soft packing 8, for example a chamois leather, subjected to moderate pressure. Thus the entire track of the beam is in the liquid. The film which emerges at the lower end between the two packings is freed from the greater part of the liquid by the leather.

In Fig. 2, the film 20 travels horizontally through a tank containing carbon tetrachloride in which only the sound track 21 is immersed. The optical system 22 protrudes through an opening into the tank. The photo-cell 25 is also cemented to the wall of the tank. The film is drawn through the tank by means of a reversing roller not shown in the drawing.

In Figs. 3 and 4 the film 3 bearing a photographic sound track 9 is guided through a U- shaped container 4 provided with a lid 13 and containing a liquid 7 having a refractive index equal to that of the material constituting the transparent support. The beam of light for scanning the sound track emanates from the optical system 1 which is introduced into the container 4 so that its front lens is in contact with the liquid. After passing through the liquid 7 and the sound track 9 of the film 3, it is projected on the photo-cell 2. Packages 10 prevent the liquid 7 in the container 4 from flowing out at the places where the optical system 1 and the photo-cell 2 traverse the wall of the container 4.

In the case of Figs. 5 and 6 the film 3 carrying the sound track 9 is passed through the liquid of a refractive index equal to that of the film material in the container 4 which has the form of a T so that only the part of the film carrying the sound track comes into touch with the liquid. For this purpose a slot-like part has been removed from the wall of the container and has been provided with a packing 10 through which the film is guided. A source of light 11 projects light on the optical system 1 the front lens of which is in touch with the liquid in the container 4. The narrow band of light which as usual in sound film reproduction emanates from the optical system, passes through the liquid, then through the sound track, again through the liquid and is then projected on the photo-cell 2 arranged on the container 4 so as to be in touch with the liquid. Packing 10 prevents the liquid in the container 4 from the flowing out of it at the places where the optical system 1 and the photo-cell 2 are introduced into the container, and where the film passes through it. Rubber lips 14 in contact with the film serve to strip the liquid still adhering to the film from the latter.

In the arrangement shown in Fig. 7 the film 3 carrying the sound track 9 is dipping only with the part occupied by the sound track into the liquid 7 having a refractive index similar to that of the film material and contained in the container 4. The film is guided through the liquid by inclined rods 12 of a smooth material, for instance glass, so that the film is not scratched. The rods 12 may be provided with a projecting edge at their upper side in order to more securely guide the film. The light from the source of light 11 is projected on the optical system 1 as usual in the reproduction of photographic sound records the front lens of which system is in touch with the liquid 7. The small band of light emanating from the optical system passes through the liquid 7, the sound track 9, again through the liquid 7 and is projected on the photo-cell 2 which is likewise in contact with the liquid 7.

In order to prevent loss by evaporation the containers of the liquid are preferably covered or constructed as closed containers except for the opening necessary for the entry and the exit of the film.

After the sound record has entered the liquid and before it is scanned it is preferably freed from any adherent air bubbles by means of a doctor or a similar device. After the film has emerged from the liquid adherent liquid is removed by drying devices of known type, such as rubber lips, squeegee rollers, blowers or the like.

The invention may be used in the reproduction of any type of photographic sound records. It is particularly applicable to sound-films, which may be of the usual kind or of the kind carrying a lenticular embossing.

In addition to the complete optical elimination of scratches on the film, the advantages offered by the present arrangement as compared with what is already known consist in a better resolution and sharpness of the scanning slot image, also in an increase in out-put of light from the slot image, and in the possibility of using a slot of considerably smaller breadth than formerly. Since the scanning beam in the arrangement according to the invention is modulated solely by the layer containing the sound record, for example, the silver layer in a photographic sound record, without the occurrence of varying losses of light by reflection at the boundary surfaces air/sound record layer/air, the slot image is considerably sharper and can also be used of smaller breadth than formerly. Thus, hitherto it is not possible to reduce the usual breadth of the slot of 20 to 40 $\mu$ below this value, for instance, to 8 to 12 $\mu$, which in its turn renders it possible to reproduce higher frequencies than formerly or to reduce the speed of the film during scanning accordingly. This circumstance is particularly advantageous in the case of a photographic sound film which does not carry cinematographic pictures in addition to the sound record. Another reason why considerably smaller breadth may be used is because in the medium having a greater refractive index than that of air the faults of the system occasioned by deflection are diminished in the same manner as that which is well known in connection with microscope immersion lenses.

What we claim is:

1. An arrangement for the reproduction of sound comprising in combination a sound record on a carrier, said sound record being capable of reproduction by scanning with a narrow band of light, a container, a liquid in said container having a refractive index substantially equal to that of said carrier, means for guiding said sound record through said liquid, an optical system in contact with said liquid for projecting a narrow beam of light on said sound record, and a photo-cell in contact with said liquid for receiving said narrow band of light modulated by said sound record.

2. An arrangement for the reproduction of sound comprising in combination a sound record on a carrier, said sound record being capable of reproduction by scanning with a band of light, a container, a liquid in said container having a refractive index substantially equal to that of said carrier, means for guiding said sound record through said liquid, an optical system adapted to project a band of light of 8 to 12 $\mu$ width on said sound record, said optical system being in contact with said liquid, and a photo-cell in contact with said liquid for receiving said narrow band of light modulated by said sound record.

3. An arrangement for the reproduction of sound comprising in combination a sound record on a carrier, said sound record being capable of reproduction by scanning with a band of light, a U-shaped container having a front wall and a back wall, a photo-electric cell of cylindrical shape passing through an opening provided in the front wall and the back wall of said U-shaped container and serving as a guide for said sound record, an optical system adapted to project a band of light of 8 to 12 $\mu$ width on said sound record passing through the bottom of said U- shaped container, said photo-electric cell and said optical system being connected in liquid-tight manner with said U-shaped container, a liquid in said container having a refractive index substantially equal to that of said carrier, said sound record, said photo-cell and said optical system being in contact with said liquid.

4. An arrangement for the reproduction of sound comprising in combination two tubes connected with each other to form a T, a slit in one of said tubes, said slit being lined with a material to ensure liquid-tight closure, a photo-electric tube introduced in the other tube in liquid-tight manner, a sound record on a carrier passing through said slit, said sound record being capable of reproduction by scanning with a band of light, an optical system introduced in said first named tube in liquid-tight manner and being adapted to project a band of light of 8 to 12 $\mu$ width on said sound record, and a liquid in said container having a refractive index substantially equal to that of said carrier, said photo-electric cell, said carrier and said optical system being in contact with said liquid.

5. An arrangement for the reproduction of sound comprising in combination a sound record on a carrier, said sound record being capable of reproduction by scanning with a band of light, a container having a bottom wall, a front wall, a back wall and two side walls, two rods mounted on said bottom wall so as to be inclined to said bottom wall for guiding said carrier, a liquid in said container having a refractive index substantially equal to that of said carrier, a photo-electric cell dipping into said liquid, an optical system for projecting a band of light of 8 to 12 $\mu$ width on said sound record passing through said front wall and being connected therewith in liquid-tight manner, said photo-electric cell and said optical system being in alignment with said sound record.

JOHN EGGERT.
RICHARD SCHMIDT.